Patented Mar. 5, 1940

2,192,460

UNITED STATES PATENT OFFICE 2,192,460

ERGOT PREPARATION AND PROCESS FOR MAKING SAME

Marvin R. Thompson, Catonsville, Md., assignor to Eli Lilly and Company, Indianapolis, Ind., a corporation of Indiana No Drawing. Application November 25, 1935, Serial No. 51,543

2 Claims. (Cl. 260—236)

The instant application is a continuation in part of my application filed August 16, 1934, Serial No. 740,199.

The present invention has reference to a hitherto unknown component or constituent of ergot and process for making the same.

This component herein called Ergostetrine is a substance which exhibits characteristic alkaloidal properties, but differs greatly from all other of the hitherto known alkaloids of ergot (ergotinine, ergotoxine, ergotamine, ergotaminine, pseudo-ergotinine, sensibamine and ergoclavine), in that its uterine stimulating or oxytocic activity develops with remarkable promptness and intensity following oral, parenteral, sublingual or rectal administration to anesthetized pregnant cats or normal puerperal humans, when compared with any of the hitherto known alkaloids or other components of ergot.

The hitherto known therapeautically significant components of ergot are ergotoxine, ergotamine and sensibamine. These components or alkaloids of ergot are possessed of oxytocic activity, but this activity manifests itself only in a much delayed, feeble and erratic manner regardless of dosage or mode of administration, when directly compared with Ergostetrine, the subject matter of the present invention, in carefully and adequately controlled tests upon anesthetized pregnant cats or normal puerperal humans.

The new component or alkaloid, Ergostetrine, can be obtained as a dry amorphous or crystalline powder, either from crude ergot or from crude ergot extracts in various ways, and for illustrative purposes I hereinafter describe several preferred methods of making or preparing the same.

From crude ergot

In accordance with one procedure I mix one kilogram of finely powdered ergot, preferably defatted with benzine, with a sufficient quantity of an aqueous solution or mixture of any alkalies, such as oxides, hydroxides, carbonates or bicarbonates of sodium, potassium, ammonium, lithium, strontium, calcium, magnesium, etc., to render it evenly and distinctly damp, and to make the resulting mixture just alkaline to litmus. The dampened and alkaline drug is then exhaustively extracted with ethyl ether, benzol, acetone, chlor-ethylenes, the chlor-methanes, or any one of the common organic solvents. The solution of the total alkaloidal cases in the organic solvent is concentrated in vacuo with or without the aid of a slight amount of heat. The amount of concentration necessary depends of course upon the particular organic solvent used, but in any case the volume should be reduced to such an amount that the conversion of the total alkaloids to their corresponding sulphates, hydrochlorides, phosphates, etc., by the addition of a sufficient amount of sulphuric, hydrochloric, phosphoric, etc., acids to make the mixture acid to litmus will cause a substantially complete precipitation of all alkaloidal salts except the Ergostetrine, the latter alkaloidal salt remaining in solution because of its greater solubility in the organic solvent. Acid ionize in organic solvents only to a very slight extent regardless of the amount added, and therefore amphoterism ceases to be a factor in the instant invention. However, approximately only one to two times the calculated molar quantity of acid is necessary, or the amount necessary to change the reaction of the solution acid to litmus. Any amount of acid added in excess of the amount necessary to convert the alkaloidal bases to their corresponding salts is of no importance as it is not ionized to any significant extent. The acid is added until the solution is acid to litmus, and the precipitated alkaloidal salts are separated by sedimentation or filtration.

After removal of the other alkaloidal salts by filtration, the salt of Ergostetrine is obtained in amorphous to semi-crystalline impure form by evaporating to dryness in vacuo. By leaching the residue with small portions of water and filtering, until 25 to 100 cc. of the aqueous solution of Ergostetrine salt is obtained, the Ergostetrine can then be obtained (a) as the dry amorphous base by precipitation from the aqueous solution by alkalinizing to litmus with sodium carbonate or bicarbonate and saturation with sodium or ammonium chloride or sulphate, collecting the Ergostetrine base on a filter and drying to constant weight in vacuo over a suitable dehydrating agent; or (b) as either the crystalline or amorphous base by alkalinizing the aqueous solution of Ergostetrine salt to litmus and shaking out with several small portions of ether, benzol, chloroform or any one of the chlorethylenes. The Ergostetrine base passes into the layer of immiscible solvent, and can be obtained as the dry substance in either crystalline or amorphous form by removal of the solvent. If ether constitutes the immiscible solvent, the product obtained is amorphous. If chloroform, benzol or di-, tri-, or tetra-chlor-ethylene constitute the immiscible solvent, Ergostetrine crystallizes out during removal of the solvent; or (c) by obtaining the total alkaloids in ether, chloroform or benzol solution by alkalinizing ergot or its crude aqueous extract to litmus and extracting with ether, chloroform or benzol, removing the organic solvent and drying in vacuo, redissolving the total alkaloids in the smallest necessary amount of acetone and adding water to the acetone which causes all alkaloids except Ergostetrine to precipitate. After discarding the precipitate, Ergostetrine is obtained by the removal of the solvent.

*From crude ergot extracts*

Crude aqueous or hydro-alcoholic extracts (liquid, semi-solid or solid) prepared by simple procedures such as described by the U. S. Pharmacopoeia, the British Pharmacopoeia, or the National Formulary, can serve as a convenient starting point for the preparation of Ergostetrine or its salts.

An amount of such extracts representing one kilogram of original ergot is preferably de-alcoholized in the conventional manner, alkalinized to litmus by the addition of any one of the alkalies above mentioned, and exhaustively shaken out with an immiscible solvent such as ether, benzol, chloroform, etc. The total alkaloids pass into the layer of immiscible solvent. From this point the Ergostetrine can be obtained in the form of either the amorphous or crystalline base or its corresponding crystalline or amorphous salts as above indicated.

It is to be understood that Ergostetrine so obtained, as the base or its salts, either crystalline or amorphous, is satisfactory for therapeutic purposes under suitable routine control without further purification. In this form it can be completely identified or differentiated from any other known constituent of ergot by oral administration of 0.1 mg. to 1.0 mg. to anesthetized pregnant cats or puerperal human patients and recording the movements of the uterus upon a kymograph. Marked to powerful contractions develop in from 2 to 15 minutes from the time of administration, the effect persisting for 1 to 10 hours, depending upon the size of the dose within the above indicated limits. No other constituent of ergot can produce an oxytocic effect as promptly, consistently and powerfully as Ergostetrine, which has been proved by actual test with all other hitherto known components and by showing that the quantitative differential removal of Ergostetrine from representative crude extracts completely removes the prompt and powerful oxytocic effect which characterizes Ergostetrine. By the same tests all other hitherto known constituents of ergot are either wholly inactive (histamine, tyramine, acetyl or other cholines, ergotinine, pseudo-ergotinine, ergotaminine, etc.) or they produce only a relatively feeble and erratic oxytocic effect approximately an hour or more after oral administration of 1.0 to 5.0 mg. (ergotoxine, ergotamine, sensibamine and ergoclavine).

For precise scientific determination of other important chemical and pharmacological characteristics, Ergostetrine can be obtained in chemically pure crystalline form by redissolving the crystalline or amorphous base obtained as above described, in the smallest necessary amount of hot benzol or chloroform. Upon cooling of the solution, the crystals of Ergostetrine form. The crystals must be collected and recrystallized repeatedly in a similar manner until the melting or decomposition point and optical activity becomes constant. Ergostetrine shows no sharp melting point, even when chemically pure, but melts with decomposition over a range of approximately 2° C. The first-crop crystals usually melt with decomposition below 150° C. When repeatedly recrystallized from benzol, the melting or decomposition point becomes constant at approximately 162° to 166° C., when placed in the bath at 160° C. and the temperature slowly raised. Ultimate analysis of pure Ergostetrine, deprived of solvent of crystallization in the usual manner, shows the composition to be $C_{19}H_{23}O_2N_3$.

Ergostetrine is a single chemical entity and not a mixture, composed of carbon, hydrogen, oxygen and nitrogen in molecular combination, and possesses typical alkaloidal properties. Its free base is alkaline in reaction and capable of neutralizing acids to form salts, and is more soluble in water as the free base than any of the above mentioned alkaloids; less soluble in water than its salts, and more soluble in alcohol, ether, chloroform and benzol than its salts. Ergostetrine salts are considerably more soluble in water than the salts of any hitherto known alkaloid. Oral dosage of 0.1 mg. to 1.0 mg. of Ergostetrine to normal puerperal humans or anesthetized pregnant cats produces a more prompt and more intense oxytocic effect than any other known alkaloid or component of ergot regardless of the size of dosage, and the effect persists from 1 to 10 hours. Furthermore, removal of this component Ergostetrine from ergot or any ergot extract completely removes the characteristic prompt and intense oxytocic activity therefrom.

Tested by the well known isolated rabbit uterus method, Ergostetrine stimulates the uterine strips into powerful contractions in concentrations of 1 to 3,000,000 to 1 to 50,000 or higher. All of the other known alkaloids of ergot show the opposite effect, that is, of depressing the uterine strips, producing the well known peinephrine-inhibition effect utilized in the classical Broom-Clark bicassay procedure.

Tested by the U. S. P. cock's-comb method, Ergostetrine is approximately 1.3 times as potent as the most potent of the other known alkaloids (ergotoxine).

Tested by the well known blood pressure method on either dogs or cats, Ergostetrine is approximately one-tenth as active as ergotoxine, ergotamine, sensibamine or ergoclavine, producing a depressor effect on lightly anesthetized dogs or cats and a pressor effect on deeply anesthetized dogs or cats. A further important difference lies in the fact that sub-toxic doses of Ergostetrine are incapable of producing the well known "epinephrine-reversal" of blood pressure in cats, whereas all of the other known active alkaloids readily produce this effect.

Ergostetrine, when recrystallized repeatedly until the optical activity becomes constant, and is placed in solution in chloroform or benzol is laevo-rotatory, while in solution in water, ethyl or methyl alcohol is dextro-rotatory.

The specific rotation in chloroform is $$[\text{Alpha}]_D^{25} = -40 \text{ to } -60 \text{ degrees.}$$

The specific rotation in water is $$[\text{Alpha}]_D^{25} = +85 \text{ to } +95 \text{ degrees.}$$

What is claimed is:

1. A process for obtaining a component of ergot, consisting of mixing a predetermined quantity of de-fatted powdered ergot with a sufficient amount of an aqueous alkaline solution or suspension, to impart an alkaline reaction to litmus, exhaustively extracting the dampened and alkaline drug with an organic solvent, concentrating the solution of the total alkaloidal bases to dryness in vacuo, then redissolving the total alkaloids in the smallest amount of acetone necessary to cause solution, adding water thereto, to cause all of the alkaloids except the desired component to precipitate, and finally discarding the precipitate and removing the solvent to obtain the desired component as a dry solid substance.

2. A process for obtaining a component of conventional crude extracts of ergot, consisting in treating a predetermined quantity of the extract to de-alcoholize the same, then mixing it with sufficient alkali to impart an alkaline reaction to litmus, then exhaustively shaking out with a water immiscible solvent, thus obtaining the total alkaloids in solution, removing the solvent in vacuo and drying, then redissolving the total alkaloids in the smallest amount of acetone necessary to cause solution, adding water thereto to cause all the alkaloids except the desired component to precipitate, and finally discarding the precipitate and removing the solvent to obtain the desired component as a dry solid substance.

MARVIN R. THOMPSON.

CERTIFICATE OF CORRECTION.

Patent No. 2,192,460. March 5, 1940.

MARVIN R. THOMPSON.

It is hereby certified that error appears in the printed specification of the above numbered patent requiring correction as follows: Page 1, first column, line 54, for the word "cases" read bases; and second column, line 14, for "Acid" read Acids; and that the said Letters Patent should be read with this correction therein that the same may conform to the record of the case in the Patent Office.

Signed and sealed this 30th day of April, A. D. 1940.

(Seal)
Henry Van Arsdale,
Acting Commissioner of Patents.